United States Patent
Bittar Romeu et al.

(10) Patent No.: US 12,398,599 B2
(45) Date of Patent: Aug. 26, 2025

(54) INSTALLATION OF SUBSEA RISERS

(71) Applicant: Subsea 7 do Brasil Servicos Ltda, Niteroi-Rio de Janeiro (BR)

(72) Inventors: Nelson Bittar Romeu, Rio de Janeiro (BR); Andre Ramiro Amorim, Rio de Janeiro (BR); Marcio Nogueira Barcellos, Rio de Janeiro (BR); Daniel Sahonero Rodrigues, Ipanema (BR); Flavio Lage Bormann, Rio de Janeiro (BR)

(73) Assignee: Subsea 7 do Brasil Servicos Ltda, Niteroi-Rio de Janeiro (BR)

( * ) Notice: Subject to any disclaimer, the term of this patent is extended or adjusted under 35 U.S.C. 154(b) by 210 days.

(21) Appl. No.: 18/076,386

(22) Filed: Dec. 6, 2022

(65) Prior Publication Data
US 2023/0112210 A1    Apr. 13, 2023

Related U.S. Application Data

(62) Division of application No. 17/275,798, filed as application No. PCT/BR2019/050391 on Sep. 12, 2019, now abandoned.

(30) Foreign Application Priority Data

Sep. 14, 2018  (GB) ..................................... 1814993

(51) Int. Cl.
*F16L 1/14*     (2006.01)
*E21B 17/01*    (2006.01)
(Continued)

(52) U.S. Cl.
CPC .......... *E21B 17/015* (2013.01); *E21B 17/012* (2013.01); *F16L 1/14* (2013.01); *F16L 1/163* (2013.01); *F16L 1/24* (2013.01)

(58) Field of Classification Search
CPC ........ E21B 17/012; E21B 17/015; F16L 1/24; F16L 1/163; F16L 1/12; F16L 1/14
See application file for complete search history.

(56) References Cited

U.S. PATENT DOCUMENTS 3,765,185 A * 10/1973 Peck ...................... F16L 1/163
                                                                294/66.1
4,400,110 A    8/1983 Beynet et al.
(Continued)

FOREIGN PATENT DOCUMENTS

EP    0 330 584 A1    8/1989
GB    2 393 426 A     3/2004
(Continued)

OTHER PUBLICATIONS

Australian Office Action received in corresponding Australian Application No. 2019339538 dated Jun. 25, 2024.
(Continued)

*Primary Examiner* — Sean D Andrish
(74) *Attorney, Agent, or Firm* — Mattingly & Malur, PC

(57) ABSTRACT

A method of installing a subsea riser includes placing an elongate negatively-buoyant support on the seabed and, when laying the riser on the seabed, guiding a riser portion onto the support to extend along and be cradled by the support. A hogbend region of the riser is then formed by conferring positive buoyancy on the support to lift the support and the riser portion away from the seabed. An element of the support includes a riser support disposed in a longitudinally extending open-ended gap between buoyancy volumes disposed on opposite sides of the gap. Coupling formations such as hinge portions can couple the element to a like element. When so coupled, the gaps of those elements align to define an upwardly opening, longitudinally extending groove to receive the riser.

20 Claims, 17 Drawing Sheets

(51) Int. Cl.
*F16L 1/16* (2006.01)
*F16L 1/24* (2006.01)

(56) References Cited

U.S. PATENT DOCUMENTS

| | | | |
|---|---|---|---|
| 4,906,137 | A | 3/1990 | Maloberti et al. |
| 6,402,431 | B1 | 6/2002 | Nish |
| 7,789,588 | B2 | 9/2010 | De Aquino et al. |
| 9,004,818 | B2 | 4/2015 | Laborde et al. |
| 10,184,589 | B2 | 1/2019 | Zhang et al. |
| 2006/0159523 | A1 | 7/2006 | Dixon et al. |
| 2007/0081862 | A1 | 4/2007 | Wolbers et al. |
| 2008/0251668 | A1 | 10/2008 | Stokes |
| 2011/0146797 | A1 | 6/2011 | Tan et al. |
| 2012/0207547 | A1* | 8/2012 | Guzick ............ F16L 1/15 405/166 |
| 2014/0186124 | A1 | 7/2014 | Tan et al. |
| 2016/0258553 | A1* | 9/2016 | Zhang ............ F16L 1/14 |
| 2019/0195025 | A1 | 6/2019 | Tan et al. |

FOREIGN PATENT DOCUMENTS

| | | |
|---|---|---|
| GB | 2 448 398 A | 10/2008 |
| GB | 2520906 A | 6/2015 |
| JP | 5-164271 A | 6/1993 |
| KR | 10-2012-0039827 A | 4/2012 |
| WO | 2007/017574 A1 | 2/2007 |
| WO | 2011/014651 A1 | 2/2011 |
| WO | 2012/172305 A2 | 12/2012 |
| WO | 2016/139457 A1 | 9/2016 |

OTHER PUBLICATIONS https://www.merriam-webster.com/dictionary/volume.
Det Norske Veritas Offshore Standard DNV-OS-F201, "Dynamic Risers" (2001).
International Preliminary Report on Patentability received in corresponding International Application No. PCT/BR2019/050391.
Written Opinion received in corresponding International Application No. PCT/BR2019/050391.
International Search Report received in corresponding International Application No. PCT/BR2019/050391.
United Kingdom Office Action received in corresponding United Kingdom Application No. GB1814993.0 dated Apr. 8, 2019.
United Kingdom Office Action received in corresponding United Kingdom Application No. GB1814993.0 dated Feb. 28, 2019.
Australian Office Action received in corresponding Australian Application No. 2019339538 dated Mar. 12, 2025.

\* cited by examiner

INSTALLATION OF SUBSEA RISERS

CROSS-REFERENCE TO RELATED APPLICATION

This Application is a division of application Ser. No. 17/275,798 filed Mar. 12, 2021, which was a 35 U.S.C. § 371 national phase conversion of PCT/BR2019/050391 filed on Sep. 12, 2019, which claims priority to Great Britain Application Number 1814993.0 filed on Sep. 14, 2018.

BACKGROUND OF THE INVENTION

This invention relates to the installation of subsea risers. The invention relates particularly to installing risers that have an intermediate reverse-curvature profile defining a hogbend, such as lazy-wave risers.

A subsea riser connects a pipeline on the seabed to the surface for transporting a fluid between those locations. In particular, production fluids containing oil and/or gas flow up the riser to a surface installation such as a platform or a floating production, storage and offloading (FPSO) vessel. Reciprocally, fluids such as water or chemicals may flow down the riser in one or more parallel pipes to support subsea oil and gas production. Power and data cables may also extend along the riser to power, control and monitor subsea installations.

Several riser architectures or configurations are known in the art and described in standards adopted by the subsea oil and gas industry, for example in Det Norske Veritas' Offshore Standard DNV-OS-F201 entitled *Dynamic Risers*. The selection of a riser configuration involves a trade-off between various factors, notably: catenary weight; sea dynamics, including currents; fatigue; materials; water depth; installation method; flowrate; and cost.

FIGS. 1*a* to 1*f* depict various known riser configurations. In each example, a riser 10 is shown extending from the seabed 12 to the surface 14, where the riser terminates at a FPSO vessel 16.

FIG. 1*a* shows the riser 10 in the form of a free-hanging catenary, which is the simplest, least expensive and easiest riser configuration to install. However, in deep water, the top tension is high due to the length and hence the weight of the riser 10 that is suspended between the vessel 16 and the seabed 12. Also, a free-hanging catenary is susceptible to damage due to motion of the vessel 16 driven by sea dynamics. The risk of damage is especially high around the touch-down point or TDP 18 of the riser 10, between the suspended portion of the riser 10 and the remainder of the riser 10 that lies on the seabed 12.

For these reasons, an S-configuration or wave-configuration riser may be preferred over a free-hanging catenary in some situations. FIGS. 1*b* to 1*f* exemplify such riser configurations. In each case, a portion of the riser 10 is lifted at an intermediate location between the seabed 12 and the surface 14 to adopt an upwardly-facing convex reversed curvature that defines a hogbend 20. The intermediate support applied to the hogbend 20 reduces the top tension and helps to decouple the TDP 18 of the riser 10 from motion of the vessel 16.

S-configurations or wave configurations may be adopted for rigid risers fabricated from steel pipe or of composite pipe, but are preferably adopted for flexible risers made of flexible pipe. In this respect, whilst rigid risers have flexibility to bend along their length, they must not be confused with risers of flexible pipe as that term is understood in the art. Unbonded flexible pipe (often abbreviated simply as flexible pipe) is characterised by a layered composite structure that comprises polymer layers and steel carcass or armour layers.

FIGS. 1*b* and 1*c* show S-configuration risers 10, which are characterised by a subsea arch or buoy 22 that is anchored to the seabed 12 to support the hogbend 20. Specifically, FIG. 1*b* shows a riser 10 with a steep-S configuration, in which the riser 10 is restrained at the TDP 18, whereas FIG. 1*c* shows a riser 10 with a lazy-S configuration, in which the riser 10 is not restrained at the TDP 18.

The complexity of installing S-configuration risers means that wave-configuration risers 10 are preferred where possible, assuming that a simpler free-hanging catenary is not practical. Wave-configuration risers support the hogbend 20 with buoyancy attached to the riser 10.

In this respect, a steep-wave riser 10 is shown in FIG. 1*d*, a lazy-wave riser 10 is shown in FIG. 1*e* and a pliant-wave riser 10 is shown in FIG. 1*f*. In these wave-configuration risers 10, buoyancy is added along a substantial length of the riser 10 to modify the curvature of the riser 10 and hence to define the shape, size and position of the hogbend 20. Optionally, weight may be added to the riser 10 at either end of the hogbend 20 to achieve a desired waveform shape.

Conventionally, buoyancy is added to a riser 10 by attaching a series of buoyancy modules 24 that are spaced along the length of the hogbend 20 as shown in FIGS. 1*d*, 1*e*, 1*f* and also in FIG. 2.

Buoyancy modules 24 have to be clamped tightly to the riser 10 to avoid any longitudinal slippage that could adversely affect the desired shape of the riser 10 or concentrate stresses in the riser 10. For this purpose, a two-part tubular clamp 26 is shown to the left in FIG. 2 being assembled around the riser 10. Once assembled, the clamp 26 is surrounded with, and engaged by, part-tubular buoyancy elements 28 as shown in the middle of FIG. 2. Once the buoyancy elements 28 have been assembled together around the clamp 26, the buoyancy elements 28 are held together by encircling straps 30 as shown to the right in FIG. 2. The buoyancy elements 28 are typically made of syntactic foam.

Buoyancy modules are assembled in turn on a pipelaying vessel when progressively overboarding or launching a riser. At least two workers are required to assemble the buoyancy modules around the riser. It is essential to mitigate any safety risk involved in placing workers so close to the firing line of the vessel, which could expose them to any unpredictable movements of the riser or the vessel.

A lazy-wave riser installation project may involve assembling and installing more than one hundred buoyancy modules per riser, with an average assembly time of around thirty minutes per module. The operation of assembling the buoyancy modules is on the critical path and delays the installation operation because the vessel has to be stopped for workers to assemble each module. Such delays are undesirable because pipelaying vessels are valuable capital assets that rely upon the availability of a limited weather window and are extremely expensive to operate.

Traditional methods that involve attaching buoyancy modules to a riser at the surface can only be employed in favourable sea states, as otherwise there is a risk of damage due to compression at the top of the riser. Mitigating this issue may require the installation of a deadweight, which increases the risks and costs of the project.

EP 0330584 and WO 2016/139457 exemplify conventional techniques for generating a hogbend and GB 2448398 exemplifies a conventional technique for coupling buoyancy modules to a riser. WO 2012/172305 teaches that the location and shape of a hogbend can be modified by changing the position of buoyancy modules along a riser.

WO 2011/014651 proposes installing buoyancy modules underwater by clamping them to a riser using a remotely operated vehicle (ROV). This proposal is complex and impractical, especially in deep water. Numerous buoyancy modules may be required, which would require correspondingly numerous trips between the surface and the riser.

In some cases, exemplified by U.S. Pat. No. 4,400,110, a pre-defined buoyant arch is manufactured to support the hogbend region of a riser. Such arches are used especially in anchored S-configuration risers as shown in FIGS. 1b and 1c. JP H05164271 discloses a combination of an arch and of buoys. WO 2007/017574 teaches that a lifting buoy may be combined with a bend-limiting device. However, installing an arch or a similar supporting structure is complex; also, transporting and lifting such a structure requires a large and expensive vessel to be available.

GB 2393426 proposes buoyancy apparatus that is configured to overcome disadvantages associated with using syntactic-foam based modules.

SUMMARY OF THE INVENTION

It is against this background that the present invention has been devised. In one sense, the invention resides in a method of installing a subsea riser. The method comprises: placing an elongate support on the seabed; when laying the riser on the seabed, guiding a portion of the riser onto the support to extend along and be cradled by the support; and forming a hogbend region of the riser by conferring positive buoyancy on the support to lift the support and the riser portion away from the seabed.

Advantageously, the support may bend along its length to conform to curvature of the hogbend region, for example by successive elements of the support being allowed to pivot relative to each other. In that case, pivotal movement between successive elements is preferably constrained to being about a substantially horizontal pivot axis. More generally, the support may be lowered into the sea ready-assembled or may be assembled from elements on the seabed.

The riser portion may conveniently be cradled in an upwardly-opening groove formation of the support. In that case, advantageously, the riser portion can enter the groove formation from above as the riser is being laid. The riser portion may be held in the groove formation by virtue of gravity and tension acting on the riser, balanced against buoyant upthrust acting on the support.

The support may be held against movement along the riser by frictional engagement and/or by mechanical engagement between the support and the riser portion. In the latter case, one or more engagement formations may be attached to the riser portion after the riser portion has been guided onto the support.

Advantageously, when conferring positive buoyancy on the support, buoyant upthrust may be applied to the support on opposite sides of the riser portion. For balance, the buoyant upthrust may be applied to the support substantially equally on the opposite sides of the riser portion. For stability, the buoyant upthrust suitably acts through centres of buoyancy on the opposite sides of the riser portion that are at a level above a centre of gravity of the riser portion.

Positive buoyancy is preferably conferred on the support substantially simultaneously on the opposite sides of the riser portion. For example, ballast may be removed from the support on the opposite sides of the riser portion at the same time. This may be achieved by detaching or expelling ballast, for example by injecting and distributing a deballasting fluid such as a gas between the opposite sides of the riser portion to displace ballast water. Conveniently, a flow of the deballasting fluid may be introduced into the support through an inlet and then the flow may be divided between the opposite sides of the riser portion.

The invention allows different vessels to be used for laying the riser, for placing the support and/or for conferring positive buoyancy on the support. In particular, the vessel or vessels used for placing the support and/or for conferring positive buoyancy on the support need not be equipped for, or indeed capable of, laying the riser.

Correspondingly, the inventive concept embraces a hogbend support element for a subsea riser. The support element comprises a riser support disposed in a longitudinally-extending open-ended gap between buoyancy volumes that are disposed on opposite sides of the gap. The buoyancy volumes may be separate from each other, conjoined with each other or in fluid communication with each other.

The support element further comprises coupling formations on at least one end for coupling to a like support element. For example, the coupling formations may be arranged for hinged connection to complementary coupling formations of the like support element. The arrangement is such that the gaps of the coupled support elements will align to define an upwardly-opening, longitudinally-extending groove.

Preferably, the buoyancy volumes are substantially symmetrical about an upright longitudinal plane that extends along the riser support. To aid stability, each buoyancy volume may have a centre of buoyancy that is at a level above a base of the riser support. The centres of buoyancy of the buoyancy volumes are suitably horizontally opposed at substantially the same level as each other.

The riser support is conveniently suspended between the buoyancy volumes. For example, the riser support may be defined by a band that extends across the gap between the buoyancy volumes. It is also possible for the riser support to be formed integrally with the buoyancy volumes.

The riser support suitably has downwardly-converging walls, which may for example be at an angle of from 50° to 80° to the horizontal.

The support element may comprise an inlet for a deballasting fluids such as a gas, in fluid communication with both of the buoyancy volumes. In that case, a manifold may be provided between the inlet and the buoyancy volumes for distributing an incoming flow of the deballasting fluid.

The inventive concept extends to a hogbend support that comprises at least two of the hogbend support elements of the invention, coupled together end-to-end. Buoyancy volumes of different support elements of the hogbend support may be in fluid communication with each other.

The inventive also concept extends to a subsea riser made by the method of the invention, or incorporating at least one support element of the invention or the hogbend support of the invention positioned under a hogbend region of the riser. The riser of the invention is apt to be of a wave configuration, such as a lazy-wave configuration.

The invention proposes an alternative solution to simplify the manufacture and installation of a subsea riser, especially by avoiding the need to install buoyancy modules aboard an installation vessel and hence saving time.

Embodiments of the invention provide a buoyant structure for supporting the hogbend region of a wave riser such as a flexible pipeline. The structure comprises: at least two support elements hinged together around a horizontal axis, each support element comprising at least a support frame, at least two distinct buoyancy tanks and a longitudinal support slot, wherein the longitudinal support slot is located between the buoyancy tanks.

The longitudinal support slot is preferably lower than the centres of buoyancy of the buoyancy tanks.

The buoyancy tanks of a support element may be fluidly connected together by at least one line. Similarly, the buoyancy tanks of the buoyant structure may be fluidly connected together by at least one line.

At least one buoyancy tank of the buoyant structure may comprise a port for deballasting and/or at least one check valve for disposal of ballast water into the sea.

Advantageously, the longitudinal support slot may have a downwardly-narrowing funnelled shape for guiding the riser into the slot. The longitudinal support slot is suitably manufactured from, or defined by, a material that has a high coefficient of friction or may be coated with such a material.

Embodiments of the invention implement a method for installing a wave riser, the method comprising: manufacturing a buoyancy structure comprising at least one buoyancy tank and a slot for receiving a riser; laying the buoyancy structure on the seabed, the buoyancy tanks of the buoyancy structure being flooded with water; laying the riser on the seabed and, during laying, positioning a hogbend region of the riser across the buoyancy structure; and deballasting the buoyancy structure to lift the hogbend region of the riser above the seabed.

The operations of laying the buoyancy structure and laying the riser are apt to be performed by distinct vessels.

The buoyancy structure is suitably articulated to impart a reverse curvature to the riser when buoyant.

The upthrust of the ballast tanks of the buoyancy structure may be pre-determined so that the optimum reverse curvature shape is obtained when all the ballast tanks are fully filled with gas.

Deballasting may comprise connecting a downline to at least one buoyancy tank of the buoyancy structure and expelling ballast water with a gas such as air or nitrogen.

The invention is designed primarily for use in installing lazy-wave risers of flexible pipe. However, the invention could be used with any S-configuration or wave-configuration riser, for example by adding a mooring system, and with any type of pipeline, whether of rigid pipe, flexible pipe or polymer composite pipe.

The invention makes it feasible to install a set of buoyancy modules on a riser pipe or on a similar elongate subsea element using a low-cost vessel such as a supply vessel, a light construction vessel or an anchor-handling tug. Also, the buoyancy modules of the invention may be less expensive than equivalent traditional buoyancy modules.

The operation of providing buoyancy can be performed off the critical path of the pipelaying operation. Also, no deadweight is required to control the operation, which improves project operability.

The whole buoyancy structure could be pre-assembled on a deck of a surface vessel before installation, hence removing the need to place workers near the structure during installation.

During installation, a low-cost vessel first deploys a buoyancy structure onto the seabed. The buoyancy structure comprises support elements that are assembled to provide the length and upthrust required to support the riser. At least some buoyancy tanks of the support elements are flooded to maintain negative buoyancy. Next, a pipelay vessel pays out a riser pipe over the buoyancy structure. Finally, a low-cost vessel deballasts the buoyancy tanks by injection of air to lift the buoyancy structure and the riser from the seabed.

In summary, the invention resides in a method of installing a subsea riser that comprises placing an elongate negatively-buoyant support on the seabed and, when laying the riser on the seabed, guiding a riser portion onto the support to extend along and be cradled by the support. A hogbend region of the riser is then formed by conferring positive buoyancy on the support to lift the support and the riser portion away from the seabed.

The invention also resides in the element of the support, which element comprises a riser support that is disposed in a longitudinally-extending open-ended gap between buoyancy volumes disposed on opposite sides of the gap. Coupling formations such as hinge portions can couple each element to a like element. When so coupled, the gaps of those elements align to define an upwardly-opening, longitudinally-extending groove to receive the riser.

BRIEF DESCRIPTION OF THE DRAWINGS

To put the invention into context, reference has already been made to FIGS. 1 and 2 of the accompanying drawings. In those drawings.

Figure 3:
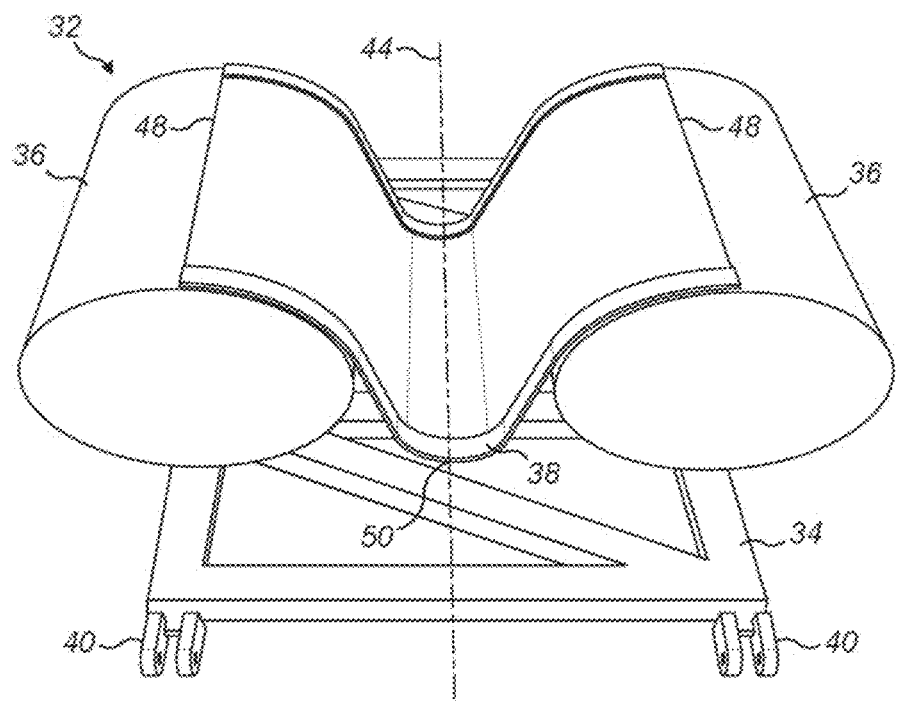
Figure 4:
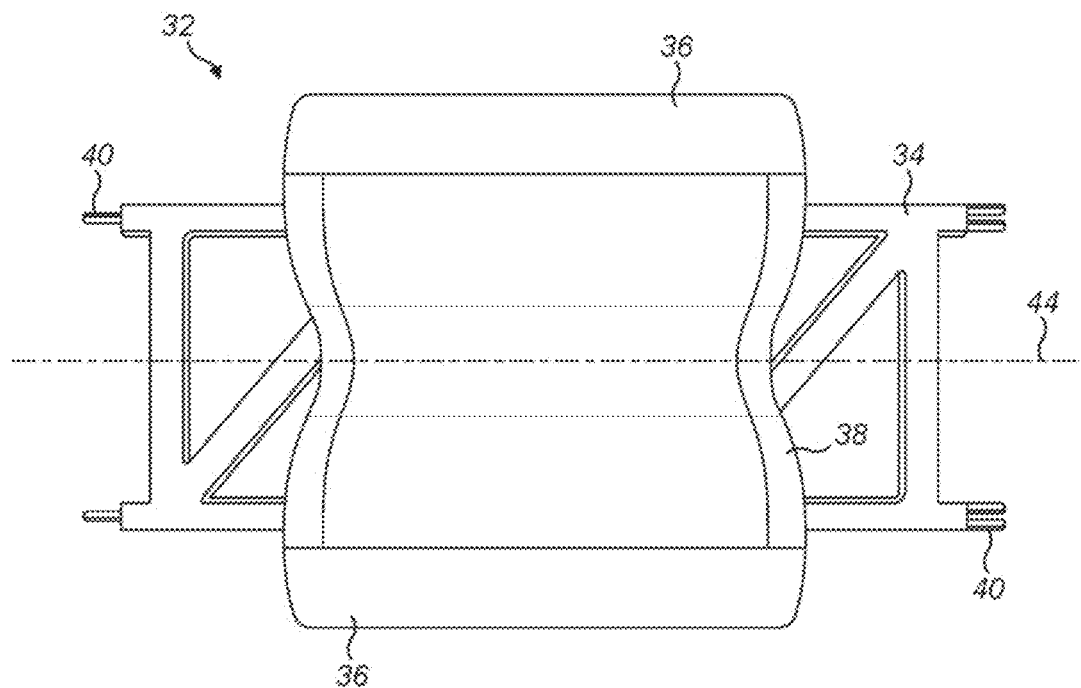
Figure 5:
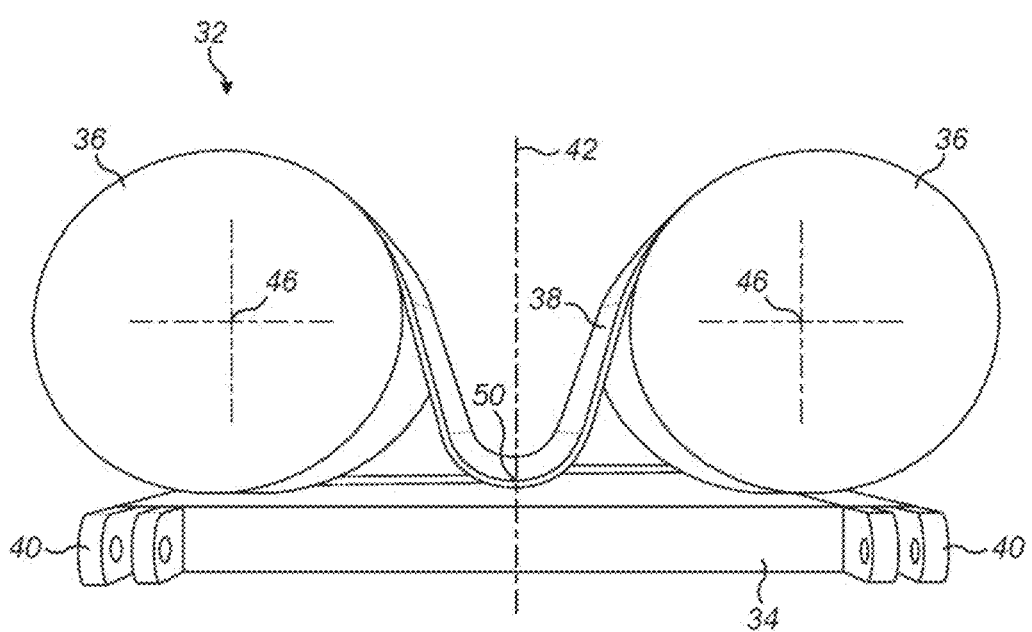
Figure 6:
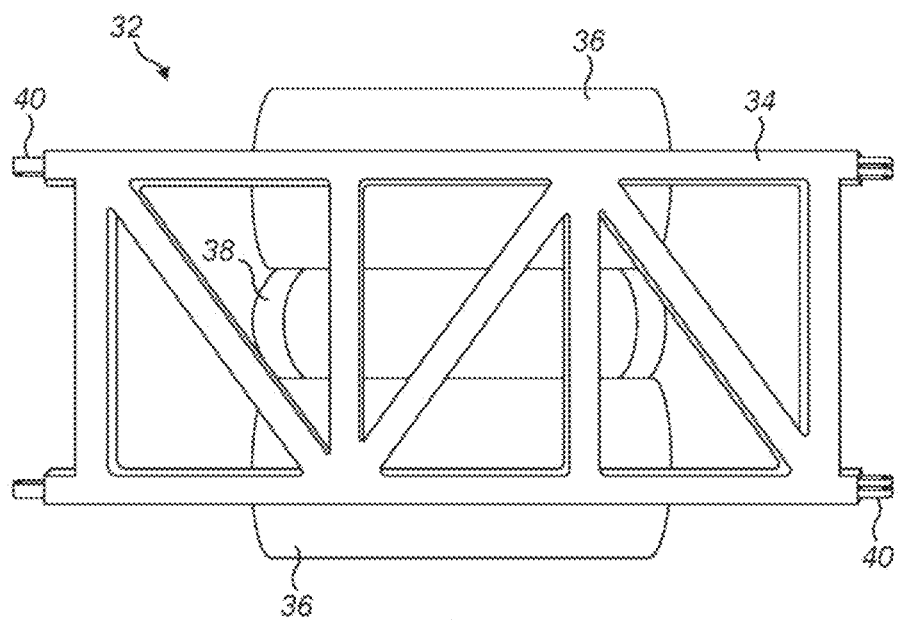
Figure 7:
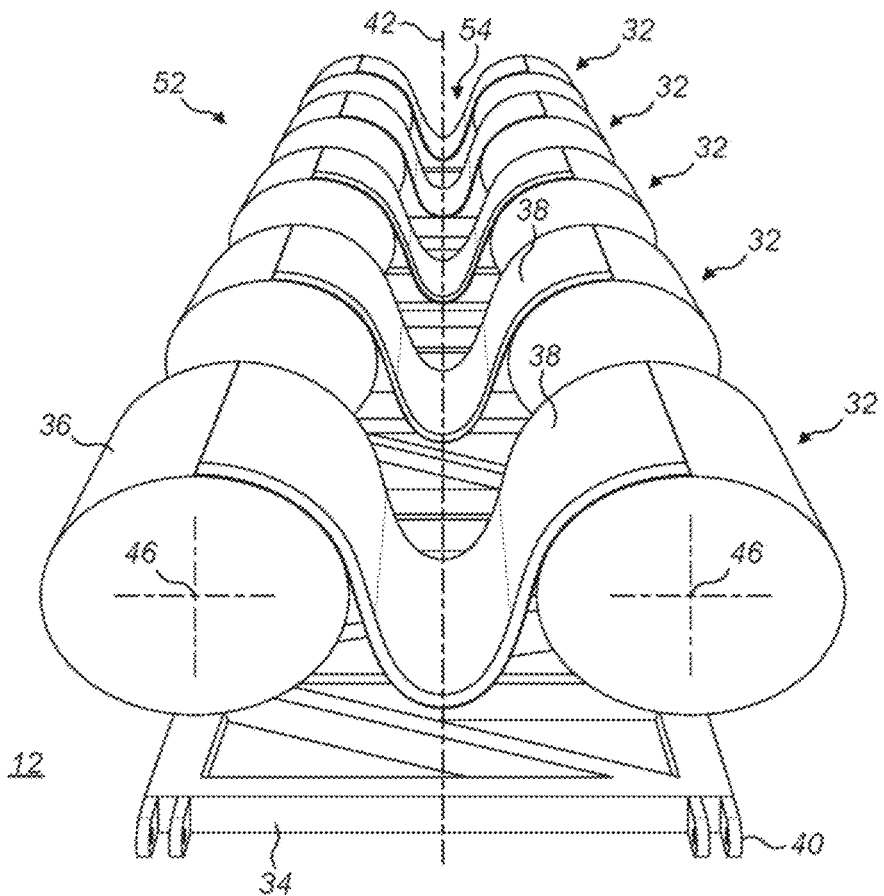
Figure 8:
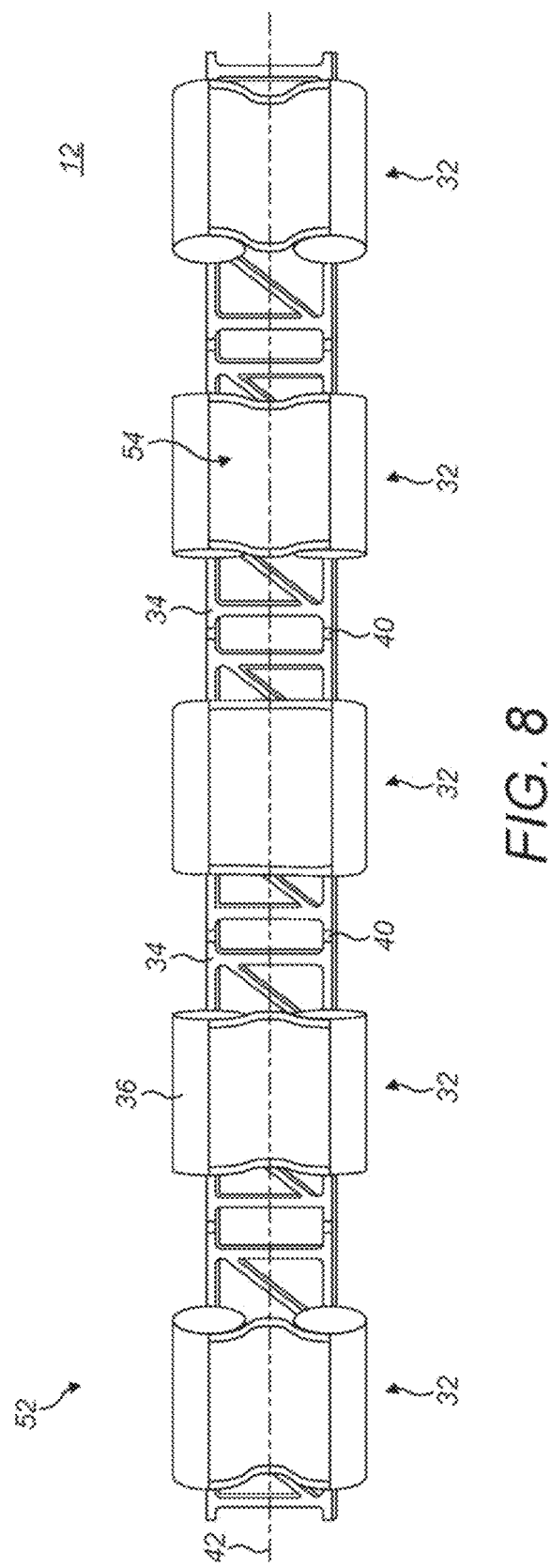
Figure 9:
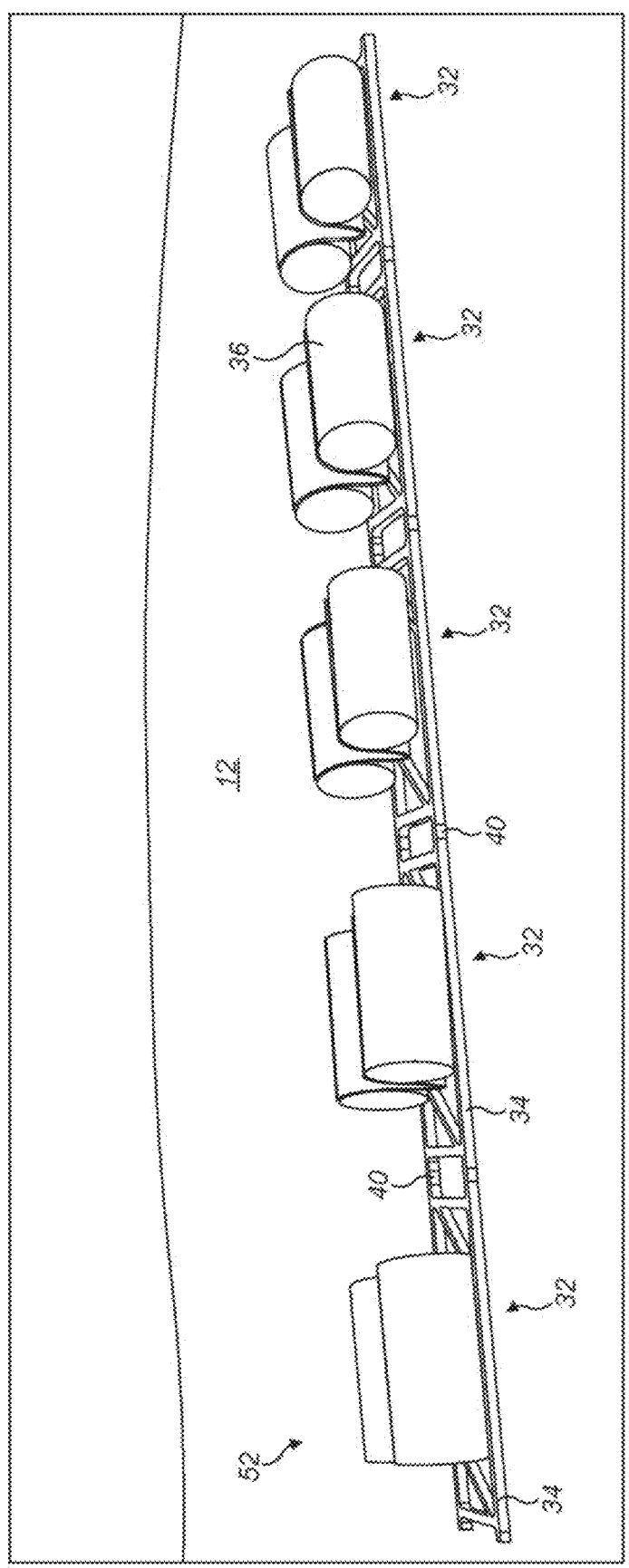
Figure 10:
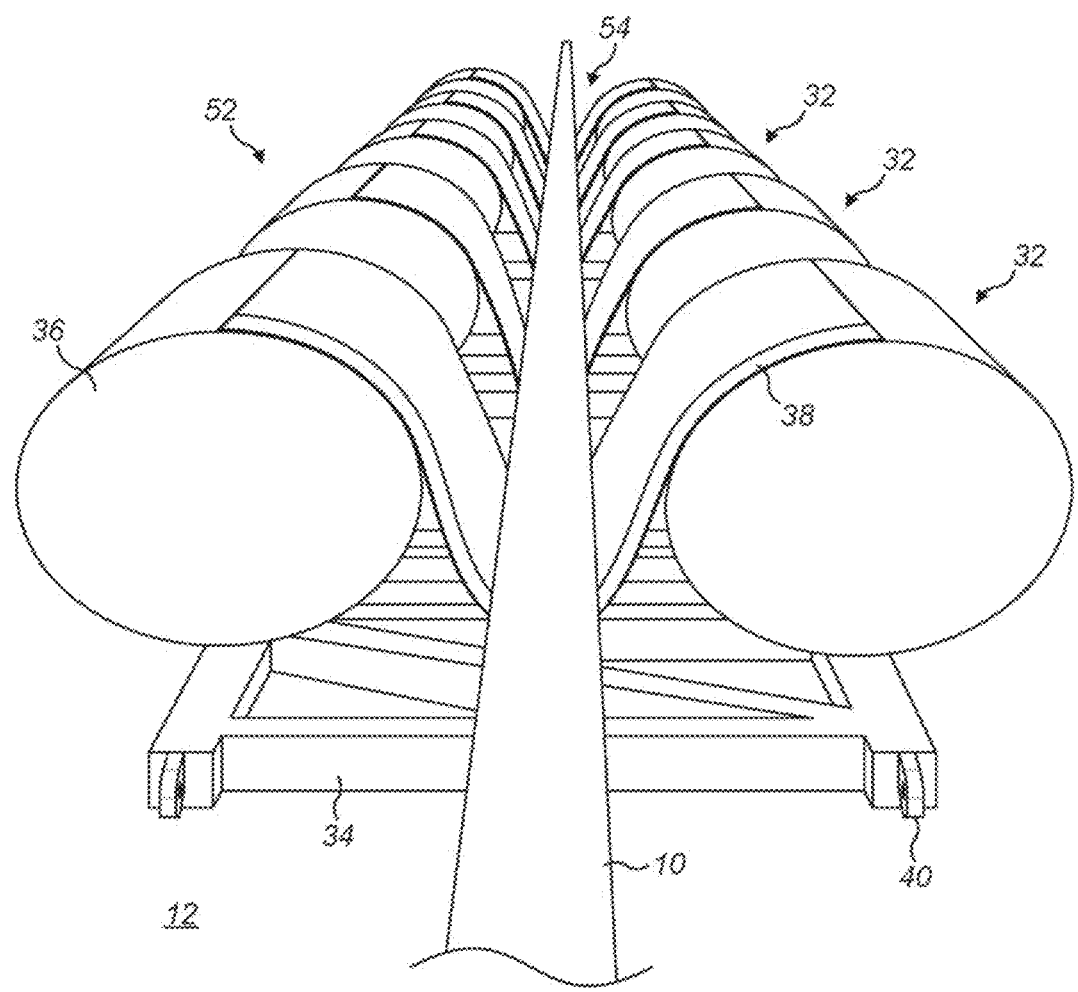
Figure 11:
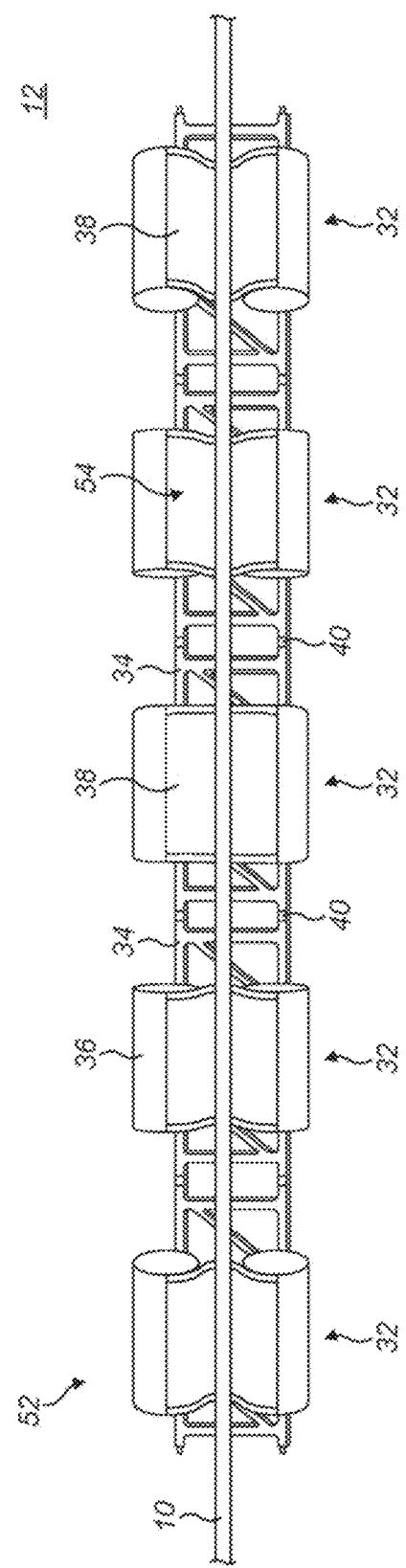
Figure 12:
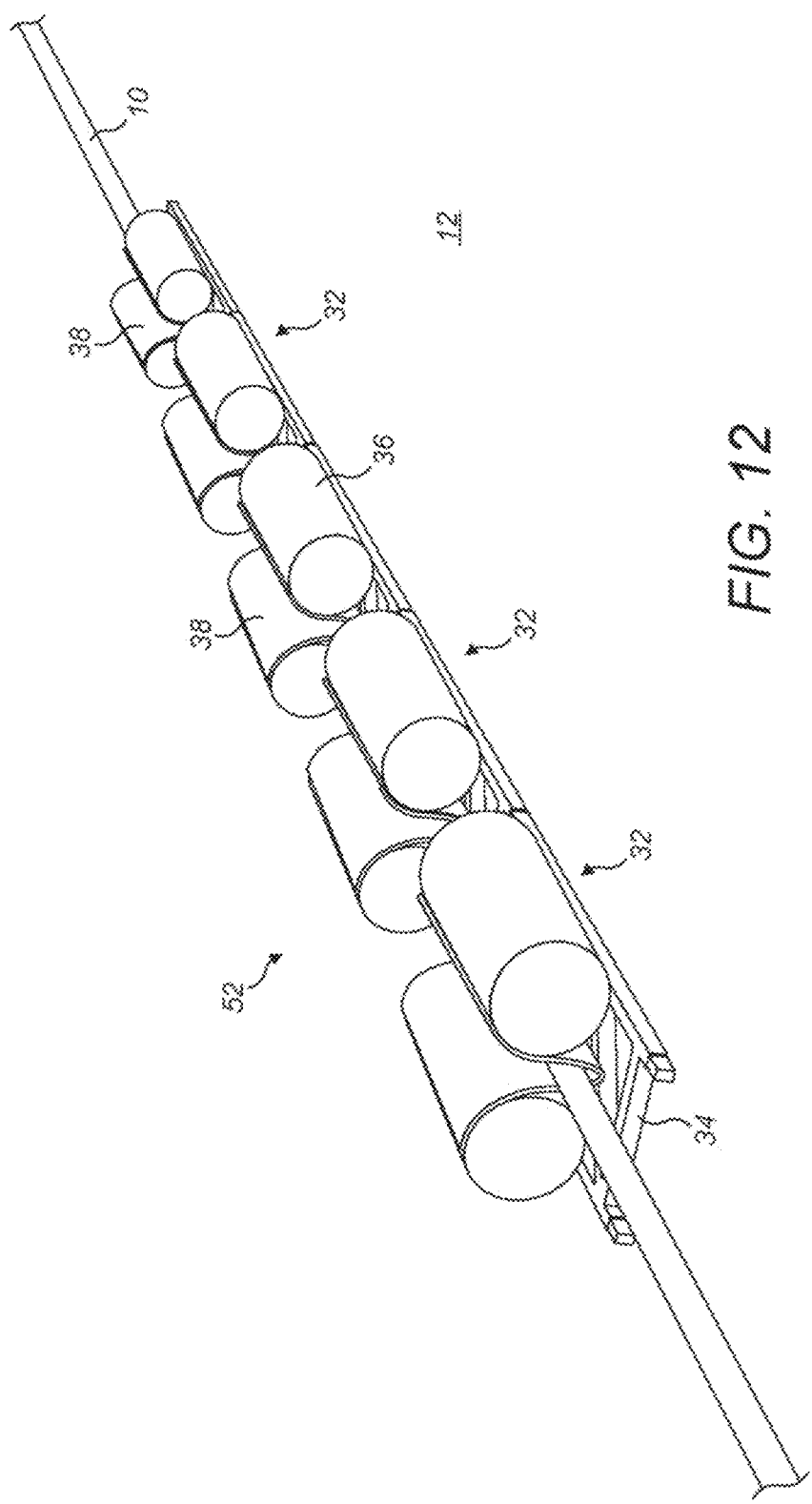
Figure 13A:
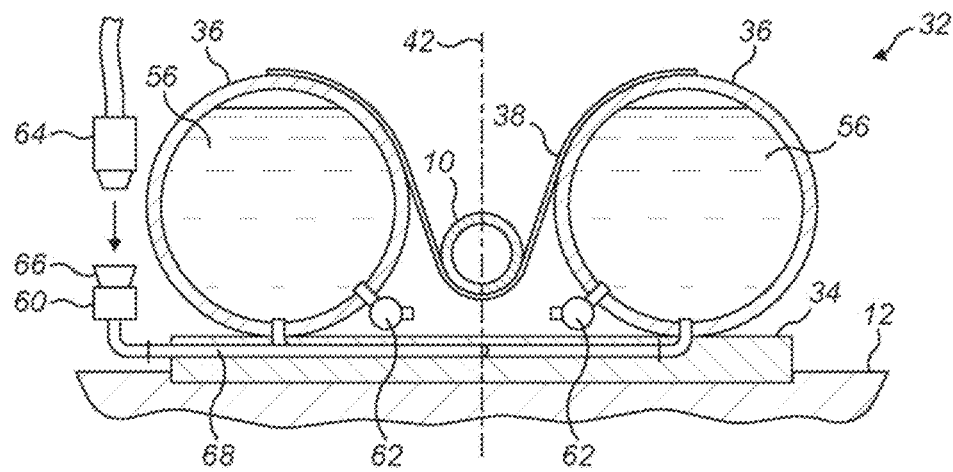
Figure 13B:
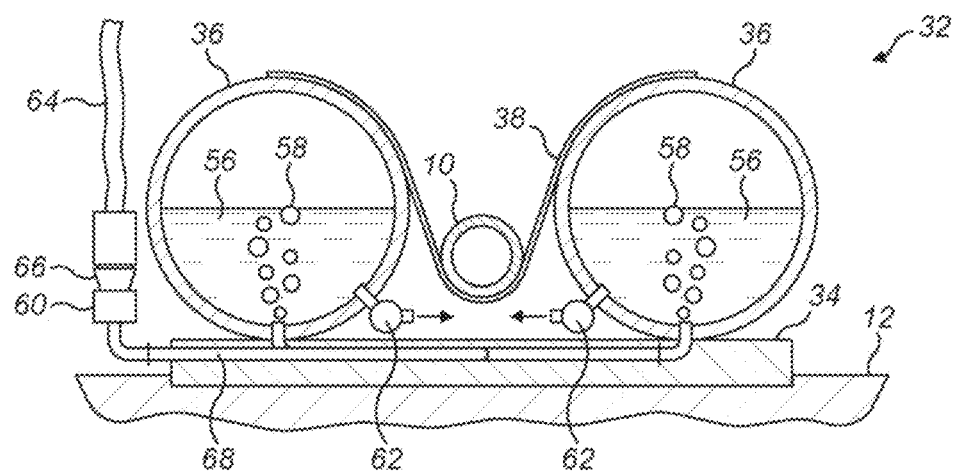
Figure 13C:
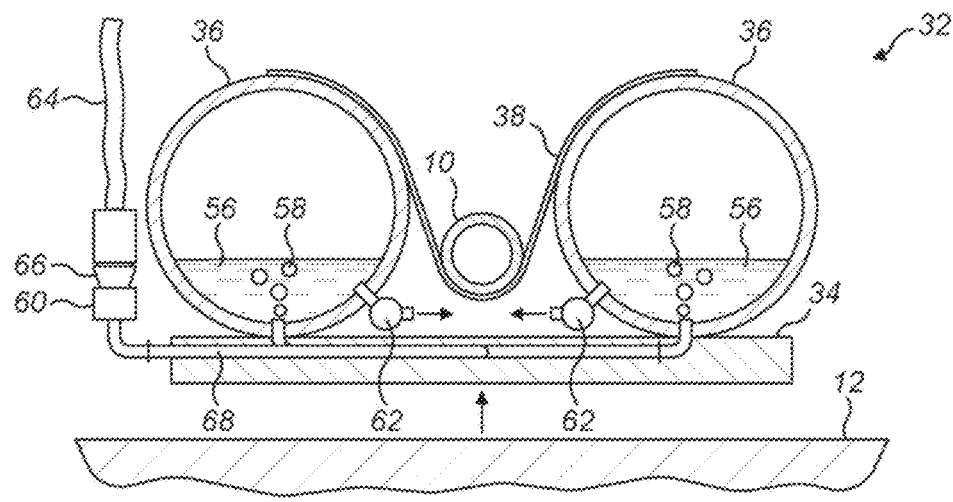
Figure 14:
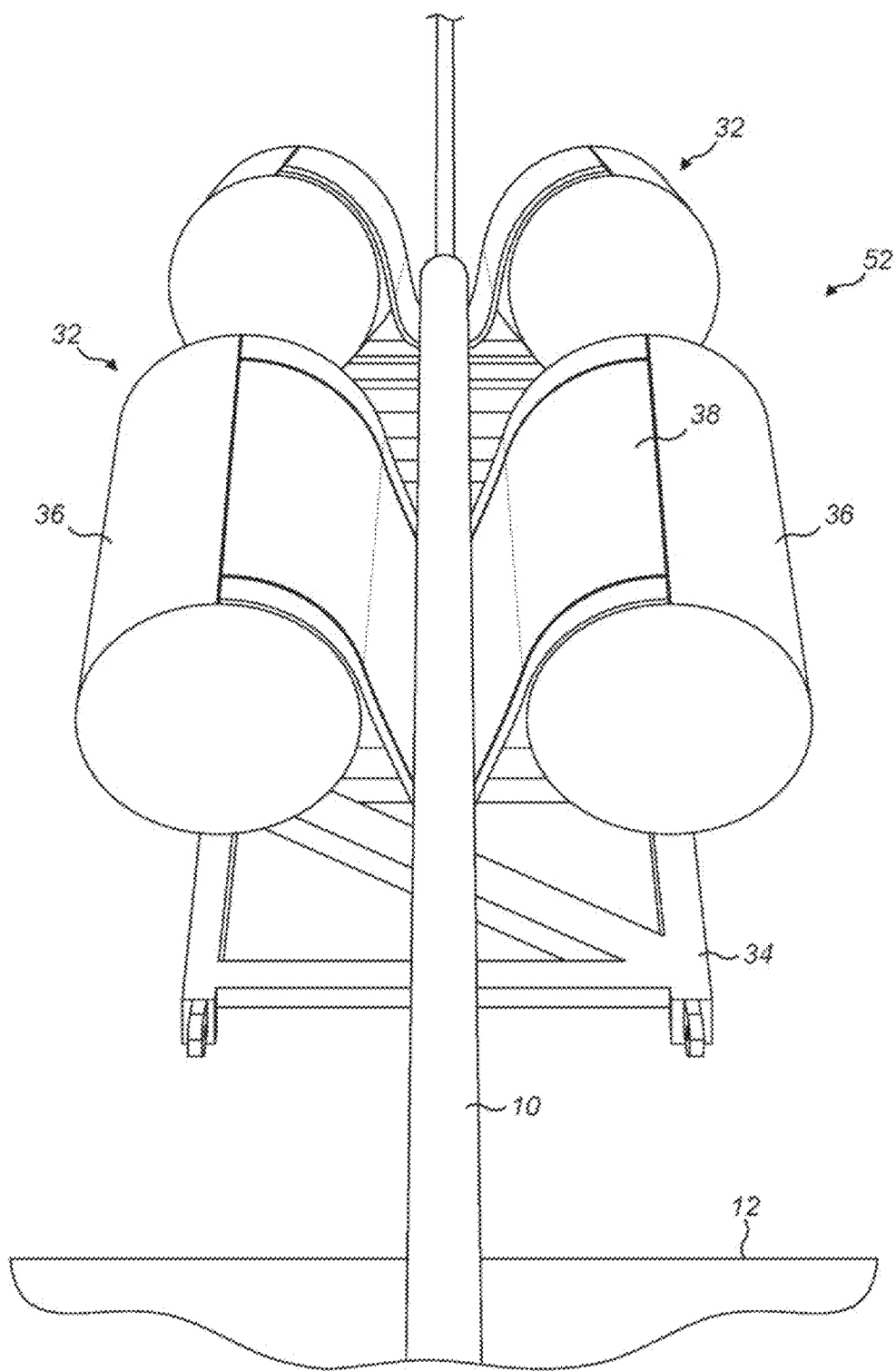
Figure 15:
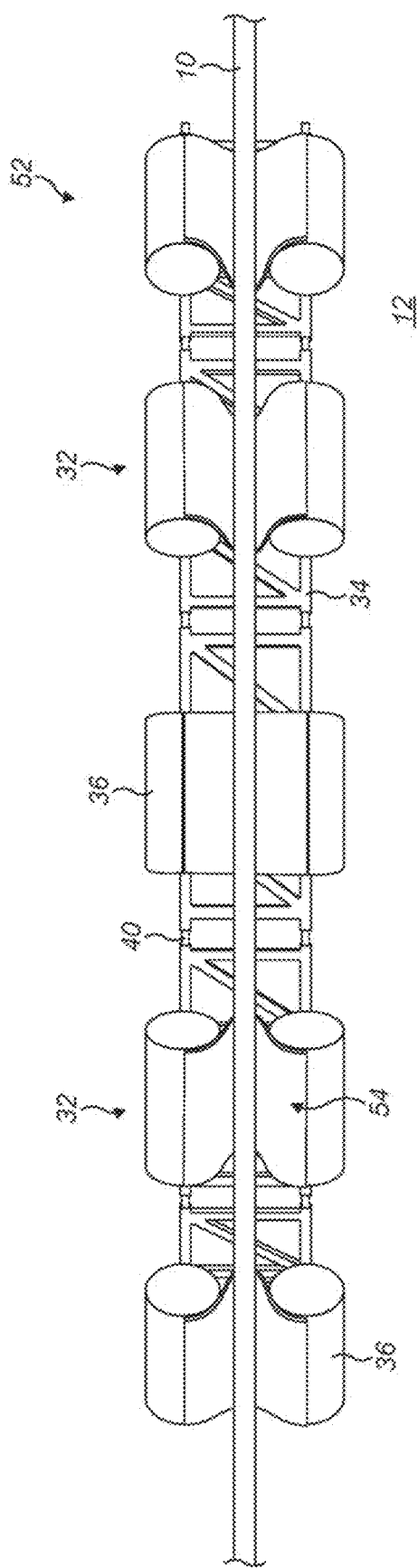
Figure 16:
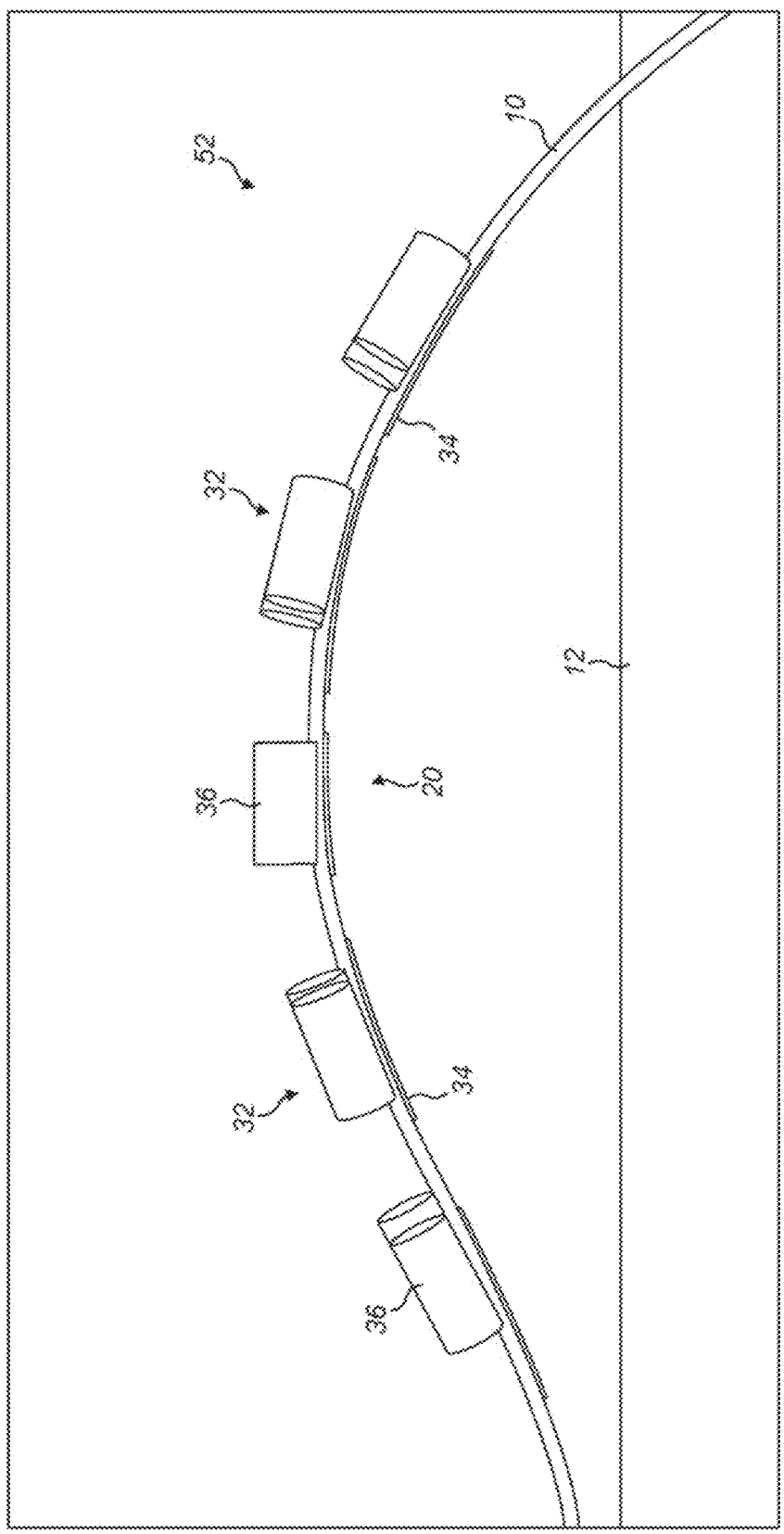
Figure 17:
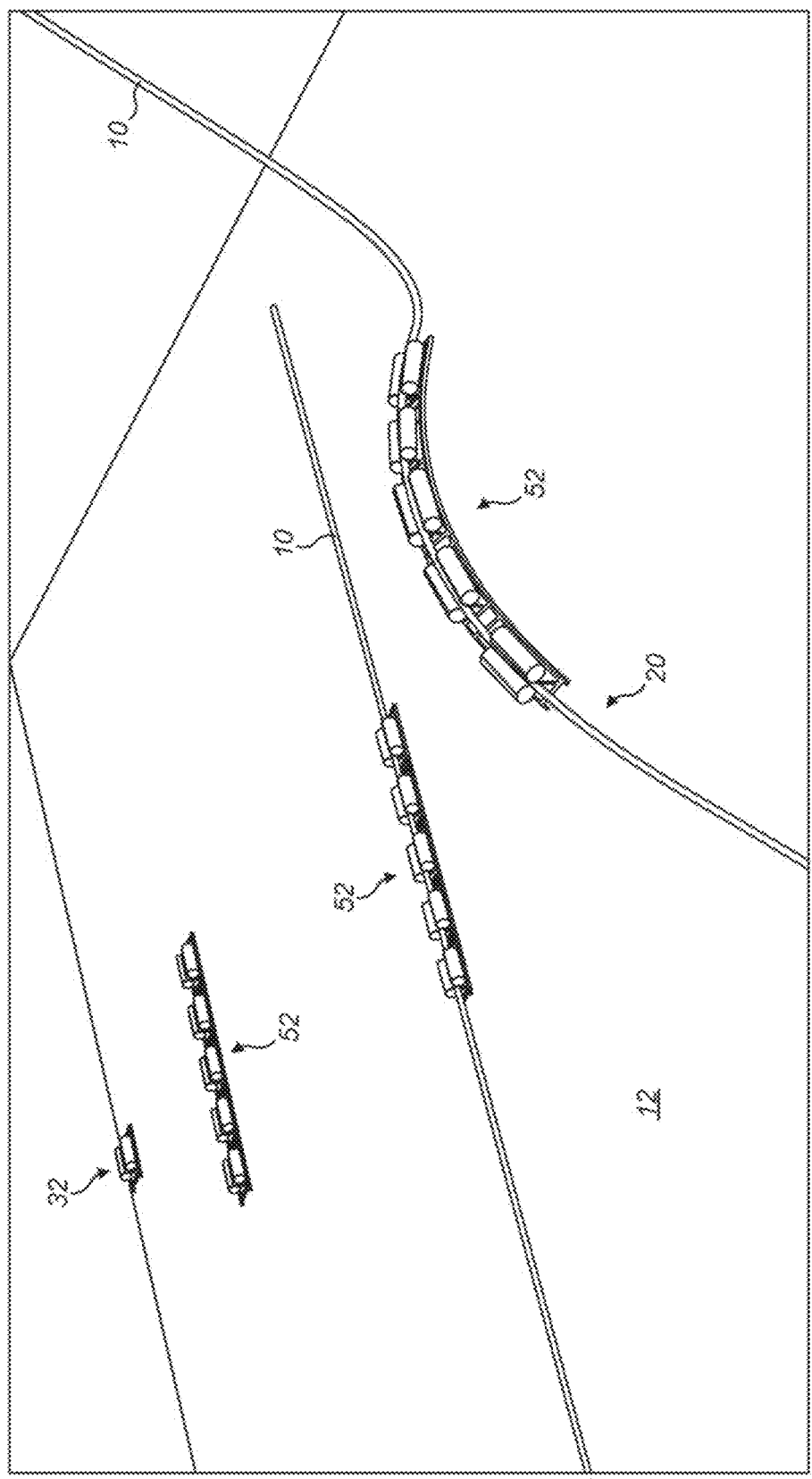
Figure 18:
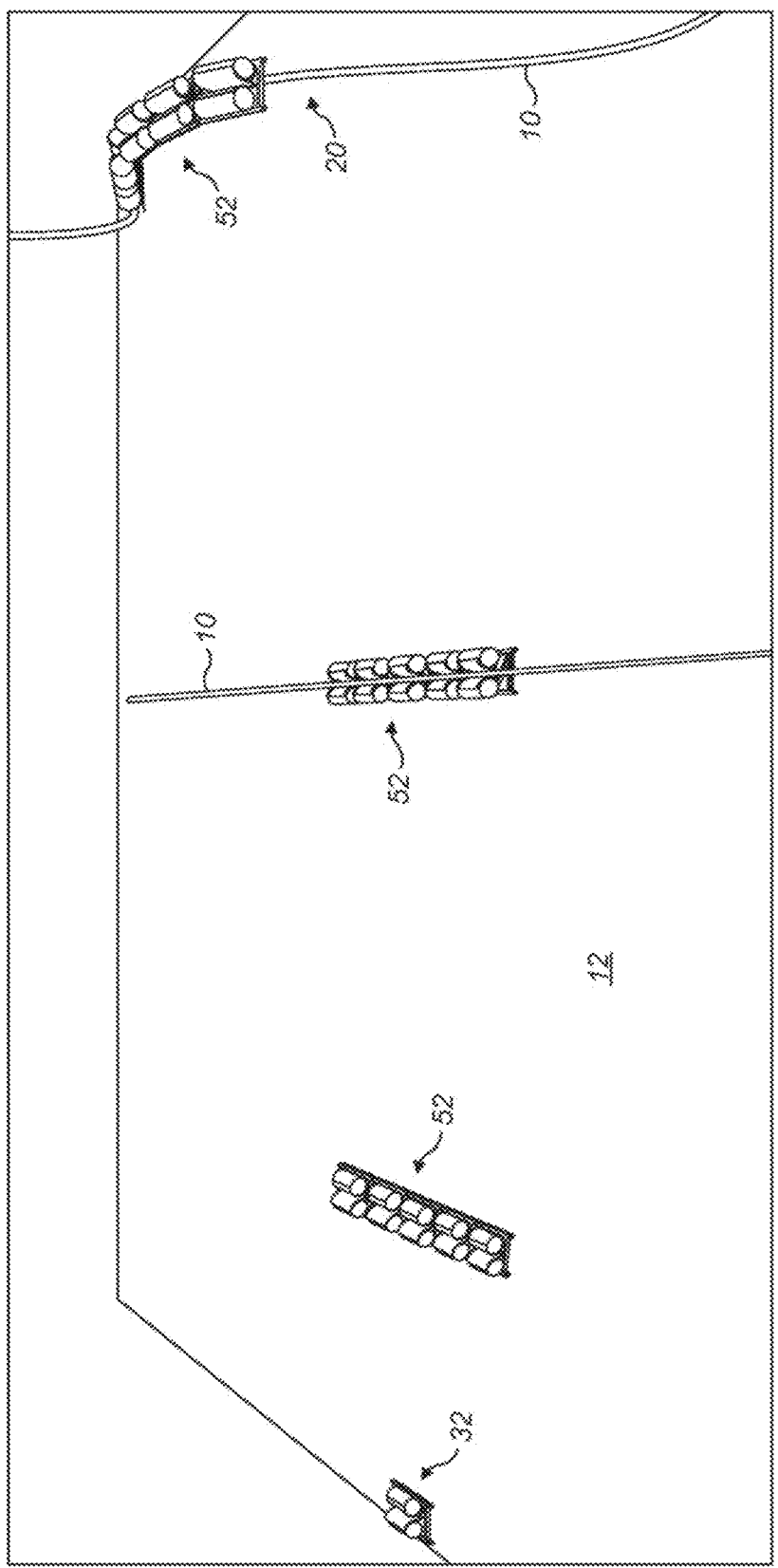
Figure 19A:
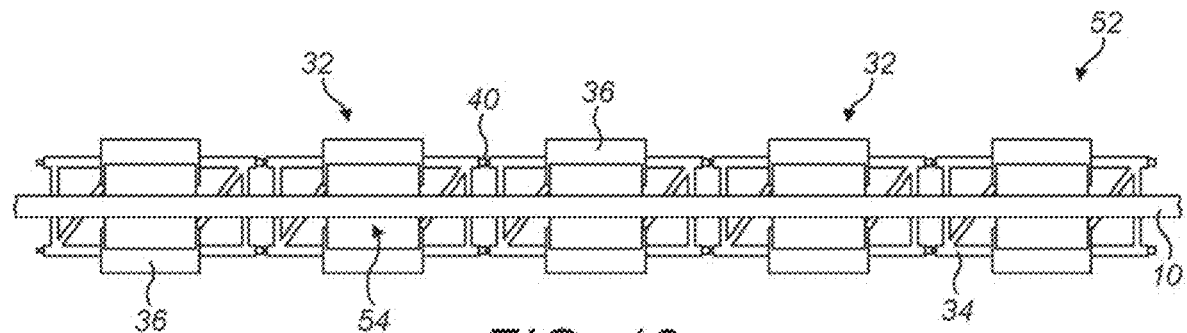
Figure 19B:
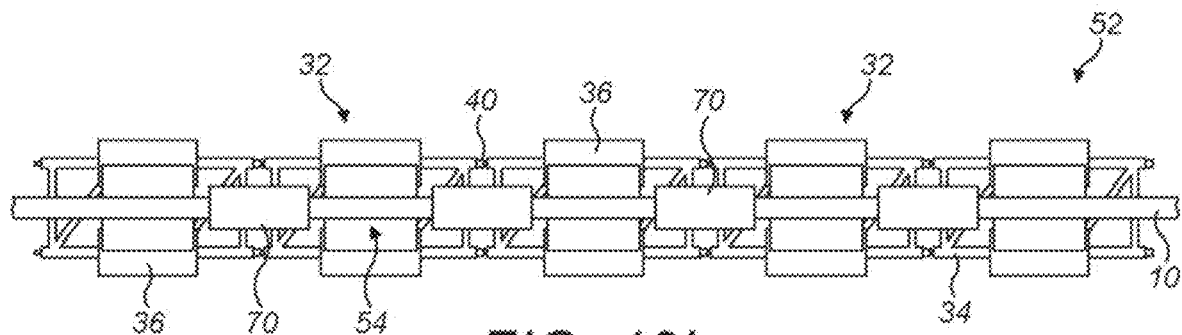
Figure 20:
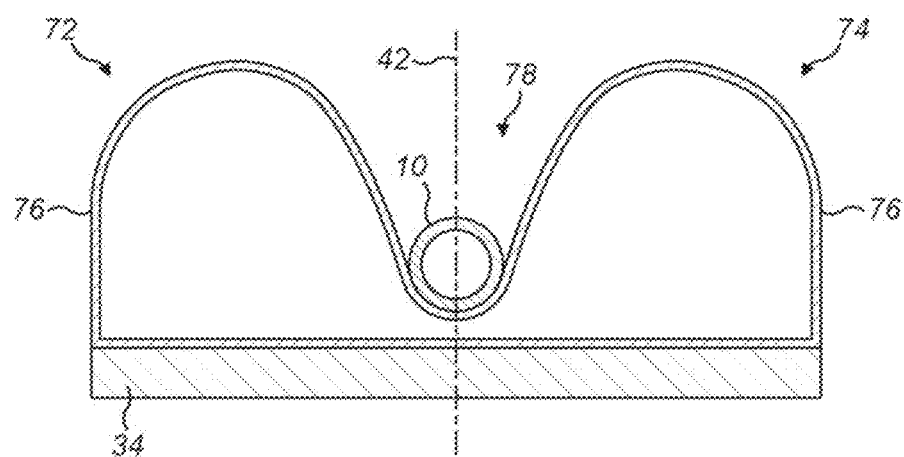

In order that the invention may be more readily understood, reference will now be made, by way of example, to the remaining drawings in which:

FIG. 3 is a perspective view of a support element of the invention, from above and one end;

FIG. 4 is a top plan view of the support element shown in FIG. 3;

FIG. 5 is an end view of the support element shown in FIGS. 3 and 4;

FIG. 6 is a bottom plan view of the support element shown in FIGS. 3 to 5;

FIG. 7 is a perspective view from above and one end of a series of support elements shown in FIGS. 3 to 6, joined together end-to-end and landed on the seabed;

FIG. 8 is a top plan view of the series of support elements shown in FIG. 7;

FIG. 9 is a perspective view from above and one side of the series of support elements shown in FIGS. 7 and 8;

FIG. 10 is a perspective view from above and one end of the series of support elements corresponding to FIG. 7 but now showing a riser laid along and supported by the elements;

FIG. 11 is a top plan view of the series of support elements supporting the riser as shown in FIG. 10;

FIG. 12 is a perspective view from above and one side of the series of support elements supporting the riser as shown in FIGS. 10 and 11;

FIGS. 13a, 13b and 13c are a sequence of schematic cross-sectional views that show how water may be displaced from a support element to lift the riser above the seabed;

FIG. 14 is a perspective view from above and one end of the series of support elements supporting the riser as shown in FIG. 10 but now providing positively buoyant support to lift the riser above the seabed;

FIG. 15 is a top plan view of the series of support elements lifting the riser above the seabed as shown in FIG. 14;

FIG. 16 is a side view of the series of support elements lifting the riser above the seabed as shown in FIGS. 14 and 15;

FIGS. 17 and 18 are perspective views that show an installation sequence, or how multiple risers may be installed in parallel operations;

FIGS. 19a and 19b are a sequence of schematic top plan views of a variant of the invention, showing a riser placed on a series of support elements as shown in FIGS. 3 to 6 being located axially relative to those support elements; and FIG. 20 is a schematic cross-sectional view of a further variant of the invention in which a support element comprises a single buoyancy tank.

DETAILED DESCRIPTION OF THE INVENTION

Where appropriate, like numerals are used for like features in the description that follows.

Referring firstly to FIGS. 3 to 6 of the drawings, a support element 32 of the invention comprises a truss beam frame 34, which is generally rectangular in plan view, and a pair of buoyancy tanks 36 that are mounted on the frame 34. The buoyancy tanks 36 are joined by a riser support 38 that spans a gap between them. Coupling formations 40 extend longitudinally from opposite ends of the frame 34.

The support element 32 is substantially symmetrical about an upright central plane 42, shown in FIG. 5, which contains a central longitudinal axis 44 shown in FIGS. 3 and 4. Thus, the buoyancy tanks 36 are substantially identical to each other in their size and shape and are spaced apart from each other about the central plane 42.

Both of the buoyancy tanks 36 are generally cylindrical and of circular cross-section in this example. The buoyancy tanks 36 extend along, and are rotationally symmetrical about, respective central axes 46 as shown in FIG. 5. The central axes 46 are parallel to, and spaced equally from, the central plane 42. In this example, the centres of buoyancy of the buoyancy tanks 36 lie on the central axes 46.

The buoyancy tanks 36 are thin-walled, hollow structures that do not need to withstand substantial differential pressure because their internal pressure will substantially balance hydrostatic pressure in use. The buoyancy tanks 36 could be made of steel, polymer or polymer composite material.

The riser support 38 is a curved sheet or band that is attached to the spaced-apart buoyancy tanks 36 and hangs down into the gap between them with a sinuous waveform shape. Specifically, the riser support 38 extends between peaks 48 at the top of the buoyancy tanks 36 via a central trough 50. In doing so, the curvature of the riser support 38, as viewed from above, changes from convex at the peaks 48 to concave around the trough 50. The lowest point of the riser support 38, defined by the trough 50, lies on the central plane 42 as shown in FIG. 5.

The riser support 38 is in contact with the buoyancy tanks 36 around almost a quarter of their circumference and then hangs freely as a catenary that extends between the buoyancy tanks 36 and the trough 50. The free-hanging side walls of the riser support 38 are inclined steeply at an angle of substantially greater than 45° to the horizontal and preferably at between 70° and 80° to the horizontal as shown. The trough 50 is at a level substantially lower than the central axes 46 of the buoyancy tanks 36, just above the top of the frame 34 that also extends across the gap between the buoyancy tanks 36.

Advantageously, the riser support 38 has sufficient flexibility to conform to the cross-sectional size and shape of a riser 10 supported by the riser support 38, as will be shown from FIG. 10 onwards. Additionally, the riser support 38 may be of a high-grip material or may be coated on at least its upper surface with a high-grip material. A high-grip material may be resilient, may have a high coefficient of friction or may be textured to improve frictional or mechanical engagement with a riser supported by the riser support 38. This resists longitudinal slippage of the support element 32 along the riser in use.

The coupling formations 40 at one end of the frame 34 complement the coupling formations 40 at the other end of the frame 34. Thus, when two or more support elements 32 are engaged with each other end-to-end, their coupling formations 40 co-operate to form joints that couple together those support elements 32 in series as a group, set or array. A linear array 52 is shown in FIGS. 7 to 9, which comprises a row of five support elements 32 whose frames 34 are joined together end-to-end via the coupling formations 40.

The coupling formations 40 are configured to allow relative pivotal movement between successive support elements 32 of the array 52. Thus, the array 52 is an articulated spine structure, of which the support elements 32 are vertebral segments. In this example, the coupling formations 40 are complementary hinge portions that form a complete hinge when they are brought together and joined by a transverse pin. In other examples, the coupling formations could form flexible joints that flex to allow similar relative pivotal movement. In any event, the relative pivotal movement between successive support elements 32 is preferably confined to a pivot axis that is substantially orthogonal to the central plane 42. This resists twisting of the array 52 along its length.

It will be apparent from FIGS. 7 and 8, especially, that the riser supports 38 of the support elements 32 in the array 52 align along the central plane 42. The riser supports 38 define a series of parallel straps or bands that are each suspended like a hammock between the successive pairs of buoyancy tanks 36. The riser supports 38 cooperate to define an elongate cradle 54 that extends along the array 52 like a substantially straight trench or groove between the buoyancy tanks 36.

The array 52 is shown in FIGS. 7 to 9 with the frames 34 of its support elements 32 resting on the seabed 12. For this purpose, the buoyancy tanks 36 are ballasted by being flooded with seawater to confer negative buoyancy on the array 52. The array 52 is oriented on the seabed 12 such that the cradle 54 defined by the successive riser supports 38 is aligned with the desired position and direction of a riser 10 to be installed subsequently.

In this respect, FIGS. 10 to 12 show a riser 10 now laid on the seabed 12 and extending over, along and beyond the array 52. The riser 10 is received in the cradle 54, where the riser 10 rests on the concave-curved bases of the riser supports 38. As the riser 10 touches down during laying, the upwardly-splayed shape of the riser supports 38 and the convex inwardly-steepening curvature of their upper portions guides the riser 10 into engagement with the cradle 54.

A specialist pipelaying vessel is required to lay the riser 10 but a different, smaller and less expensive vessel could be used to place the array 52 of support elements 32 onto the seabed 12 before the riser 10 is laid. For example, the array 52 could be assembled on the seabed 12 by lowering separate support elements 32 in succession and joining them together underwater with the assistance of an ROV. Alternatively, the array 52 could be assembled above, at or near to the surface 14 and then lowered to the seabed 12 as an assembly.

FIGS. 13a, 13b and 13c show an example of how the support elements 32 of the array 52 may be deballasted to apply localised upthrust to the riser 10, thereby to generate a hogbend 20 in the riser 10 as shown in FIGS. 14 to 16. To do so, the buoyancy tanks 36 of the support elements 32 are deballasted by expelling ballast water 56 from within them. This confers sufficient positive buoyancy on the array 52 that the array 52 will lift buoyantly away from the seabed 12, carrying a length of the riser 10 with it. Positive buoyancy means that buoyancy force exceeds weight, thus generating the required upthrust.

A gas 58 such as air or nitrogen is injected into the ballast tanks 36 through a non-return valve 60 to displace water 56 from the ballast tanks 36 and into the surrounding sea through respective non-return valves 62. In this example, the gas 58 is injected via a downline 64 that is shown in FIG. 13a approaching docking engagement with an inlet 66. Gas 58 could instead be injected from a subsea pump, which could be carried by or integrated with an ROV. A low-density liquid such as kerosene may be used instead of a gas 58 as a deballasting fluid and may also be supplied via a downline 64. In any case, deballasting can be performed with the support of a vessel that is much smaller and less expensive than a pipelaying vessel.

A manifold 68 connects the ballast tanks 36 of a support element 32 to each other for fluid communication to distribute the incoming gas 58 between them. This allows gas 58 to be introduced, conveniently, through a single inlet 66 while ensuring that the ballast tanks 36 will deballast in unison to avoid any imbalance in their buoyant upthrust. Similarly, the ballast tanks 36 of different support elements 32 may be fluidly connected to each other to balance upthrust along the length of the array 52.

When the downline 64 has been coupled with the inlet 66 as shown in FIG. 13b, gas 58 is injected into the ballast tanks 36 through the manifold 68. When sufficient water 56 has been displaced from the ballast tanks 36, the array 52 acquires positive buoyancy and lifts away from the seabed 12 as shown in FIG. 13c. This also lifts the length of the riser 10 that lies in the cradle 54 of the array 52 away from the seabed 12.

FIGS. 14 to 16 show how the length of the riser 10 that lies in the cradle 54 of the array 52 becomes part of the hogbend 20. The buoyant array 52 adopts a convex curvature, when viewed from above, to match the curvature of the hogbend 20. To allow this, the support elements 32 hinge relative to each other about the joints formed by their interconnected coupling formations 40.

FIGS. 17 and 18 show the steps of a riser installation operation in accordance with the invention, in sequence from left to right. Initially, a single support element 32 is laid on the seabed 12 and then is assembled with similar support elements 32 to form a linear array 52. Next, a riser 10 is laid along the array 52 and finally the array 52 is deballasted to lift the hogbend 20 of the riser 10 away from the seabed 12. Chronologically, those steps may be performed in sequence or in parallel, using different vessels to save time and cost.

FIGS. 19a and 19b show a variant of the invention that takes a different approach to axial location to resist slippage between the array 52 and the riser 10. FIG. 19a shows the riser 10 laid in the cradle 54 defined by the array 52. FIG. 19b shows radially-projecting locating formations 70 mounted on the riser 10 to fit between the support elements 32 of the array 52. These locating formations 70 bear against a neighbouring support element to limit relative axial movement between the array 52 and the riser 10.

Figure 1A:
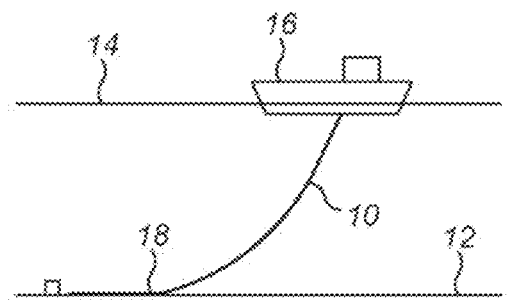
FIGS. 1a to 1f are simplified schematic side views that exemplify various known riser configurations.
Figure 1B:
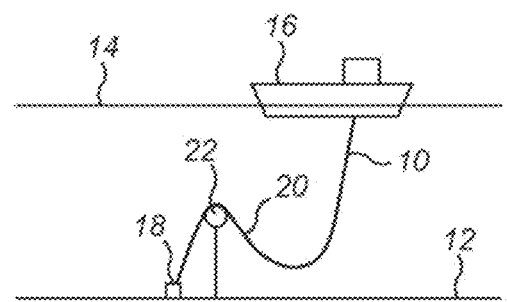
Figure 1C:
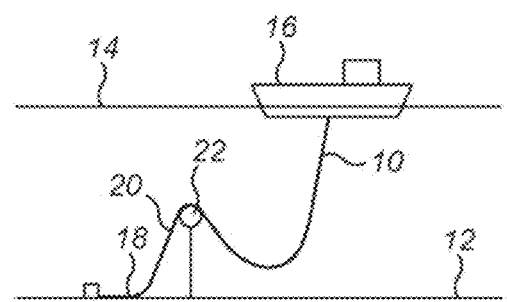
Figure 1D:
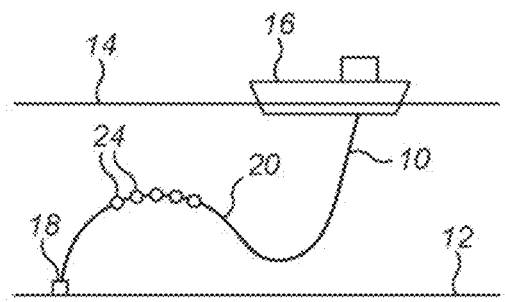
Figure 1E:
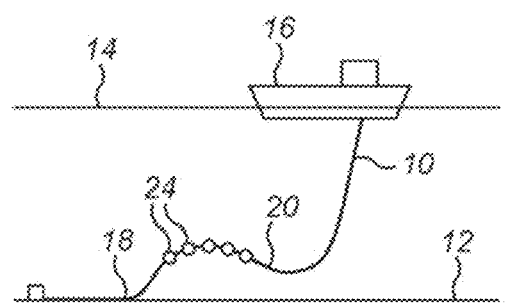
Figure 1F:
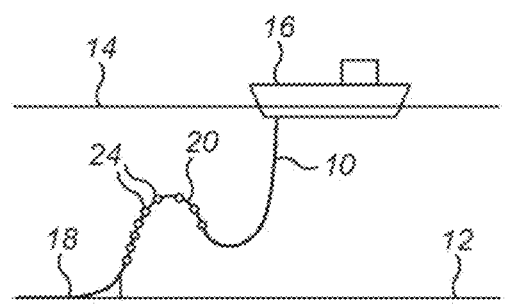
Figure 2:
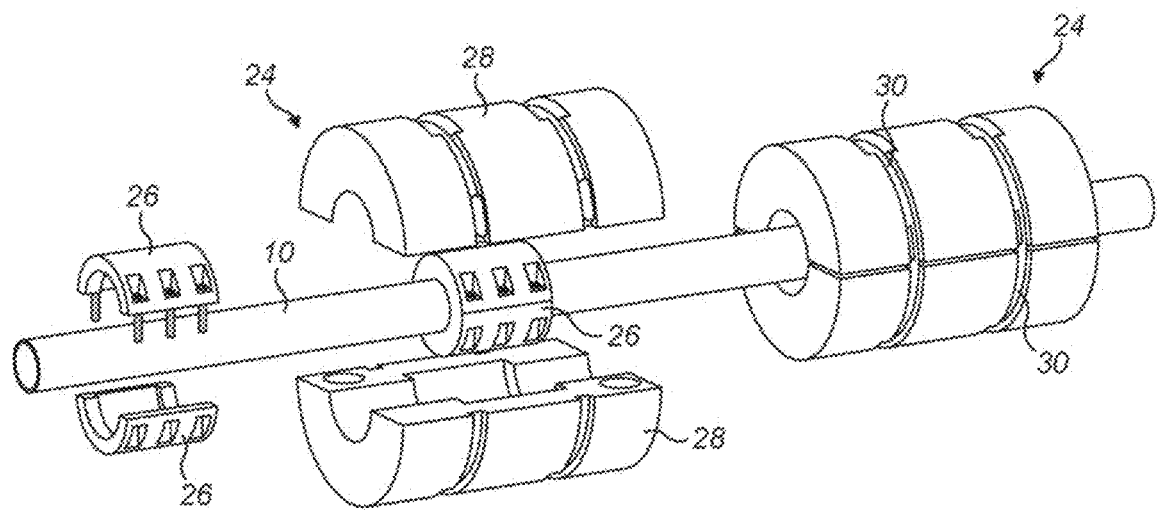
FIG. 2 is a perspective view that shows how a known buoyancy module is assembled around and secured to a riser.

The locating formations 70 could be assembled around and clamped to the riser 10 in the manner of the clamps 26 that are shown in FIG. 2. One or more locating formations 70 could, in principle, be attached to the riser 10 aboard an installation vessel but are preferably attached to the riser 10 underwater, for example by an ROV, to take the operation off the critical path of the pipelaying operation. Other arrangements to effect mechanical axial engagement between the riser 10 and the array 52 are possible. For example, locating formations could be formed integrally with the riser 10.

Turning finally to FIG. 20, this shows a support element 72 that is a variant of the support element 32 shown in the preceding drawings. Provisions to inject deballasting fluid and to expel ballasting water are not shown in this simplified view but could correspond to those shown in FIGS. 13a to 13c.

The support element 72 shown in FIG. 20 has a single buoyancy chamber 74 that is supported by a base frame 34. The buoyancy chamber 74 is substantially symmetrical about a central plane 42, comprising enlarged conjoined lobes 76 that are spaced apart by a groove 78 between them to receive and cradle a riser 10.

In this example, the upwardly-facing surfaces of the lobes 76 and the groove 78 largely follow the shape of the corresponding surfaces of the buoyancy tanks 36 and the riser support 38 of the preceding embodiment. However, other cross-sectional shapes are possible. In general, it is desirable that the groove 78 extends low enough to support the riser 10 with its centre of gravity at a level substantially beneath the centre of buoyancy of the support element 72 as defined by the upwardly-projecting lobes 76 of the buoyancy chamber 74.

Many other variations are possible within the inventive concept. For example, the frames of the support elements need not be fully rigid but could instead be at least partially flexible. Such flexibility could aid bending of the array along its length so as to conform to the shape of the hogbend. Nor is it essential for a flexible support to comprise multiple elements.

The support elements of the array need not confer the same degree of positive buoyancy along the full length of the array. For example, greater buoyancy could be concentrated near the middle of the array than at the ends of the array. This could be achieved in various ways, for example by having larger buoyancy elements where more buoyancy is required or by removing less ballast from buoyancy elements where less buoyancy is required.

Similarly, it is not essential that buoyancy is distributed regularly with equal spacing along the array. For example, there could be irregular longitudinal spacing between the support elements.

At least some of the buoyancy of the array could be contributed by elements that have fixed buoyancy, such as modules of syntactic foam. One or more elements with variable buoyancy, such as ballast tanks, could then be used to establish overall negative, neutral or positive buoyancy of the array as may be required. This would helpfully reduce the volume of deballasting fluid that is required to confer overall positive buoyancy on the array.

In principle, it is not essential for deballasting to require displacement of water with a gas or other liquid. For example, a ballast material that is denser than water could be released from the array to establish sufficient positive buoyancy to lift the hogbend region of a riser above the seabed. Such a ballast material could be in the form of one or more clump weights, or in the form of a particulate or otherwise flowable mass.

In some riser configurations, the array could be tethered to an anchoring foundation on the seabed.

Provision may be made to re-ballast at least some elements of the array so as to control or reverse the installation process, for example to lower the hogbend toward the seabed on decommissioning the riser.

The invention claimed is:

1. A method of installing a subsea riser, comprising:
   placing an elongate support on a seabed;
   during laying of the riser on the seabed, guiding a riser portion onto the support to extend along and be cradled by the support; and
   forming a hogbend region of the riser by conferring positive buoyancy on the support to lift the support and the riser portion away from the seabed.

2. The method of claim 1, comprising cradling the riser portion in an upwardly-opening groove formation of the support.

3. The method of claim 2, wherein the riser portion enters the groove formation from above as the riser is being laid.

4. The method of claim 2, comprising holding the riser portion in the groove formation by virtue of gravity and tension acting on the riser against buoyant upthrust acting on the support.

5. The method of claim 1, comprising holding the support against movement along the riser by frictional engagement between the support and the riser portion.

6. The method of claim 1, comprising holding the support against movement along the riser by mechanical engagement between the support and the riser portion.

7. The method of claim 6, comprising attaching one or more engagement formations to the riser portion after guiding the riser portion onto the support.

8. The method of claim 1, comprising applying buoyant upthrust to the support on opposite sides of the riser portion upon conferring positive buoyancy on the support.

9. The method of claim 8, wherein the buoyant upthrust is applied to the support substantially equally on the opposite sides of the riser portion.

10. The method of claim 8, wherein the buoyant upthrust acts through centres of buoyancy on the opposite sides of the riser portion, which centres of buoyancy are above a centre of gravity of the riser portion.

11. The method of claim 8, comprising conferring positive buoyancy substantially simultaneously on the opposite sides of the riser portion.

12. The method of claim 11, comprising removing ballast from the support on the opposite sides of the riser portion.

13. The method of claim 12, comprising distributing a deballasting fluid between the opposite sides of the riser portion.

14. The method of claim 13, comprising introducing a flow of the deballasting fluid into the support through an inlet and then dividing the flow between the opposite sides of the riser portion.

15. The method of claim 1, comprising bending the support along a length of the support to conform to curvature of the hogbend region.

16. The method of claim 15, comprising bending the support by pivoting rigid elements of the support relative to each other.

17. The method of claim 16, comprising constraining movement between the elements to pivotal movement about a substantially horizontal pivot axis.

18. The method of claim 1, comprising assembling the support from elements on the seabed.

19. The method of claim 1, comprising laying the riser using a different vessel to a vessel used for placing the support and/or for conferring positive buoyancy on the support.

20. The method of claim 19, wherein the vessel used for placing the support and/or for conferring the positive buoyancy on the support is not equipped for laying the riser.

* * * * *